(12) United States Patent
Laliberte et al.

(10) Patent No.: US 10,543,543 B2
(45) Date of Patent: Jan. 28, 2020

(54) ADVANCED SAW USER INTERFACE SYSTEM

(71) Applicants: Robert Bosch Gmbh, Stuttgart (DE); Robert Bosch Tool Corporation, Broadview, IL (US)

(72) Inventors: Eric R. Laliberte, Naperville, IL (US); Brian C. Taylor, Elmhurst, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 4 days.

(21) Appl. No.: 15/946,543

(22) Filed: Apr. 5, 2018

(65) Prior Publication Data

US 2019/0308260 A1 Oct. 10, 2019

(51) Int. Cl.
*B27G 19/02* (2006.01)
*B23D 59/00* (2006.01)
*G05B 19/409* (2006.01)
*B23D 45/06* (2006.01)

(52) U.S. Cl.
CPC ......... *B23D 59/001* (2013.01); *B23D 59/008* (2013.01); *G05B 19/409* (2013.01); *B23D 45/062* (2013.01); *G05B 2219/32128* (2013.01); *G05B 2219/45144* (2013.01)

(58) Field of Classification Search
CPC .. B23D 59/001; B23D 59/008; B23D 45/062; G05B 19/409; G05B 2219/32128; G05B 2219/45144
See application file for complete search history.

(56) References Cited

U.S. PATENT DOCUMENTS

| | | | |
|---|---|---|---|
| 7,137,327 B2 | 11/2006 | Garcia et al. | |
| 7,680,546 B2 * | 3/2010 | Gilbert | G06F 9/4488 700/17 |
| 10,322,522 B2 * | 6/2019 | DeCicco | B27G 19/02 |
| 2011/0100183 A1 | 5/2011 | Tomaino | |
| 2013/0131844 A1 * | 5/2013 | Campney | G05B 19/0426 700/83 |
| 2014/0318342 A1 | 10/2014 | Koegel et al. | |
| 2015/0277431 A1 * | 10/2015 | Taylor | G05B 19/4163 700/185 |
| 2016/0263762 A1 * | 9/2016 | Ramaswamy | B26D 5/005 |
| 2016/0263768 A1 * | 9/2016 | DeCicco | B27G 19/02 |
| 2016/0265763 A1 | 9/2016 | Laliberte et al. | |
| 2018/0297228 A1 * | 10/2018 | Middleton | B26D 5/007 |

* cited by examiner

*Primary Examiner* — Omar Flores Sanchez
(74) *Attorney, Agent, or Firm* — Maginot, Moore & Beck LLP

(57) ABSTRACT

A table saw includes a saw control unit and a wireless communication module dock defining a docking position. A wireless communication module is configured to be removably received in the docking position, the wireless communication module being operably connected to the saw control unit when received in the docking position. The wireless communication module includes an antenna and a wireless transceiver, the antenna and the wireless transceiver being configured to implement a first wireless communication protocol.

12 Claims, 7 Drawing Sheets

ADVANCED SAW USER INTERFACE SYSTEM

TECHNICAL FIELD

This disclosure relates generally to power tools, and, more specifically, to user interface devices in a saw.

BACKGROUND

Table saws are power tools used to cut work pieces of wood, plastic and other materials. Such saws are among the most widely used power tools in woodworking and materials processing shops, carpentry and building work sites. Four general classes of table saws are in common use including bench top table saws, contractor table saws, cabinet table saws and hybrid table saws. Advancements in power tool technology have resulted in the incorporation of many different types of sensors into power tools, including table saws, along with processors for processing the sensor data and performing other tasks. However, the ability for an operator to take advantage of this technology has been limited, particularly in table saws. What is needed is an advanced user interface system for a table saw with onboard and remote controls that enable an operator to get the most out of the functionality of the table saw.

DESCRIPTION

Figure 1:
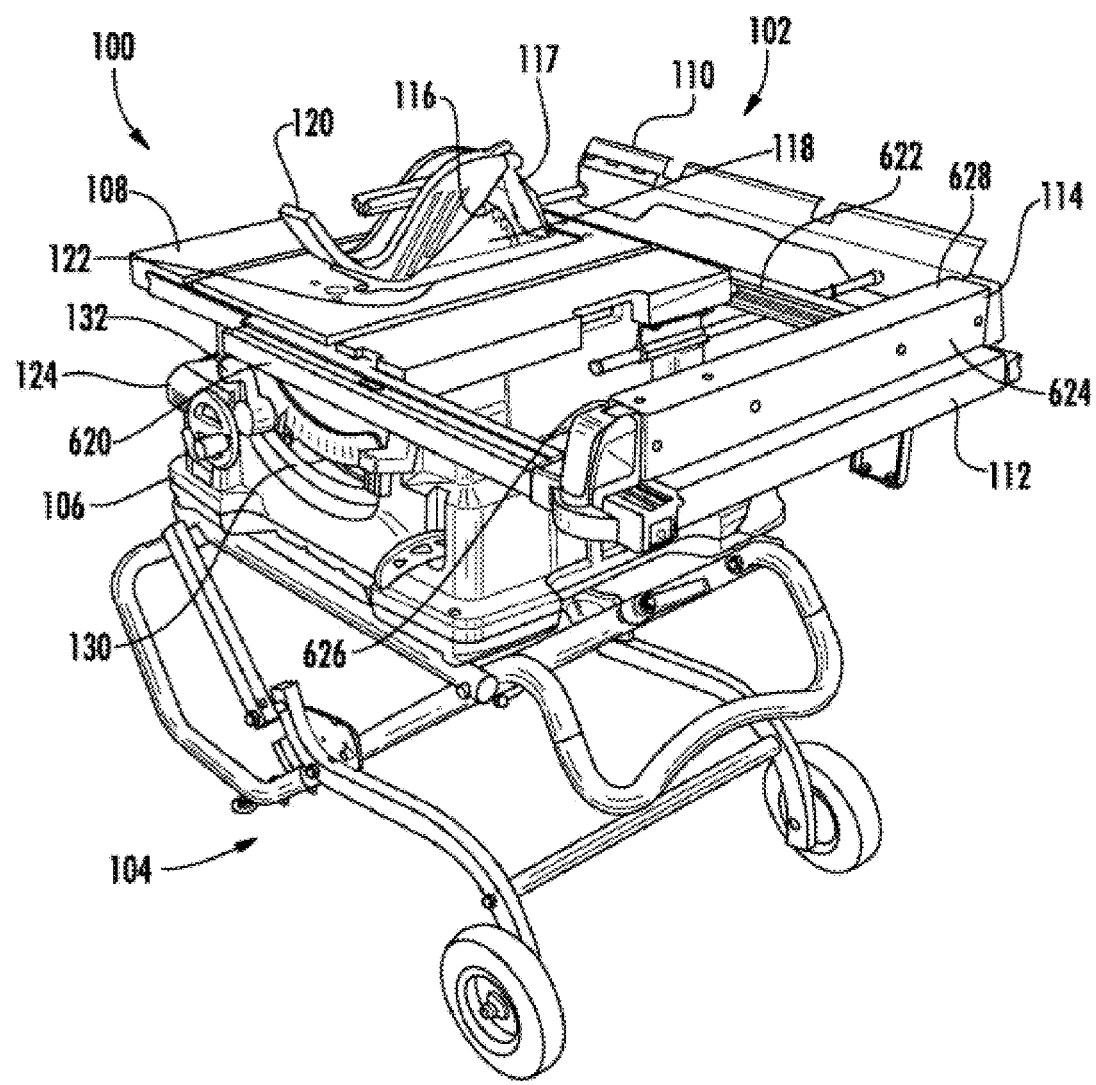
FIG. 1 depicts a top perspective view of a table saw mounted to a wheeled stand.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to a person of ordinary skill in the art to which this disclosure pertains.

Figure 2:
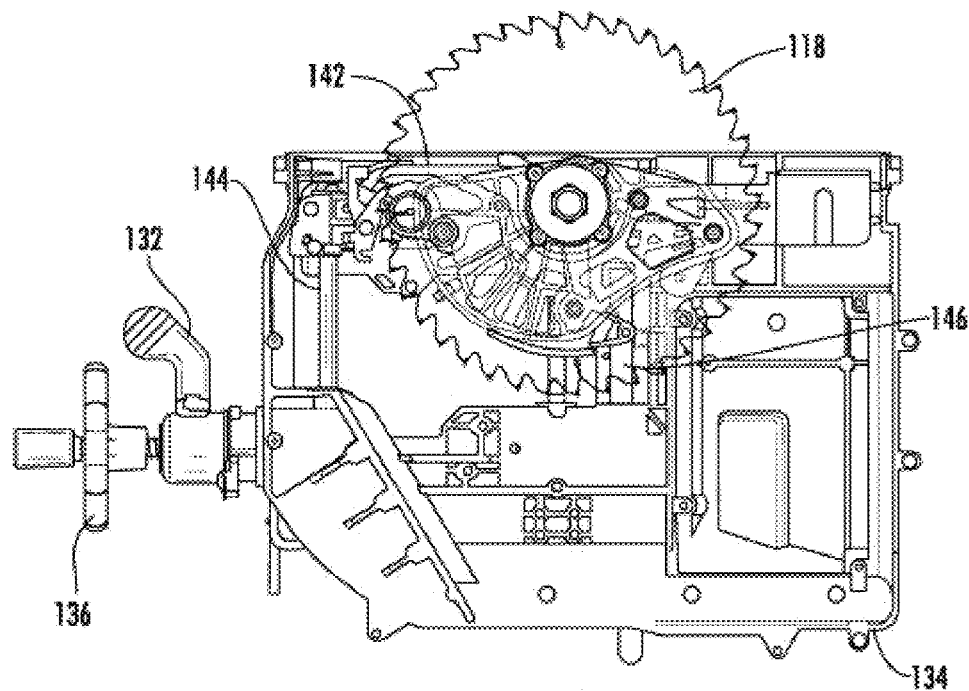
FIG. 2 depicts a side plan view of the right side of the table saw of FIG. 1 with the housing, bevel plate, and workpiece support surface removed and the height adjust carriage at an upper position.

Referring to FIG. 1, a table saw assembly 100 is shown. The table saw assembly 100 includes a table saw 102, in this case, mounted to a wheeled stand 104. The table saw 102 includes a base housing 106 which spaces a workpiece support surface 108, workbench or the ground in order to allow for blade adjustment. A cutting assembly is supported within the base housing 106. The cutting assembly is supported from the work surface 108 within the base housing 106. The cutting assembly includes a motor 112, a blade 118, and a carriage 134. The motor 112 is configured to receive power from a power supply (FIG. 2) for driving the blade 118. The blade 118 extends upwardly through an opening in the workpiece support surface 108 for cutting a workpiece supported thereon. The cutting assembly carriage 134 operably supports the cutting assembly within the base 106. The cutting assembly carriage 134 may be configured to enable the blade 118 to beveled to perform beveled cutting operations.

A human machine interface (HMI) unit 124 is provided at a front portion of the table saw 102. An angle indicator 130 located adjacent to the HMI unit 124 indicates the angle of the blade 118 with respect to the workpiece support surface 108. A bevel adjust lock 132 may be used to establish the angle of the blade 118 with respect to the workpiece support surface 108 by pivoting the carriage 134 (shown in FIG. 2) within the base 106. The carriage 134 is then clamped between the bevel adjust lock 132 and a bevel clamp 133 (see FIG. 3).

Figure 3:
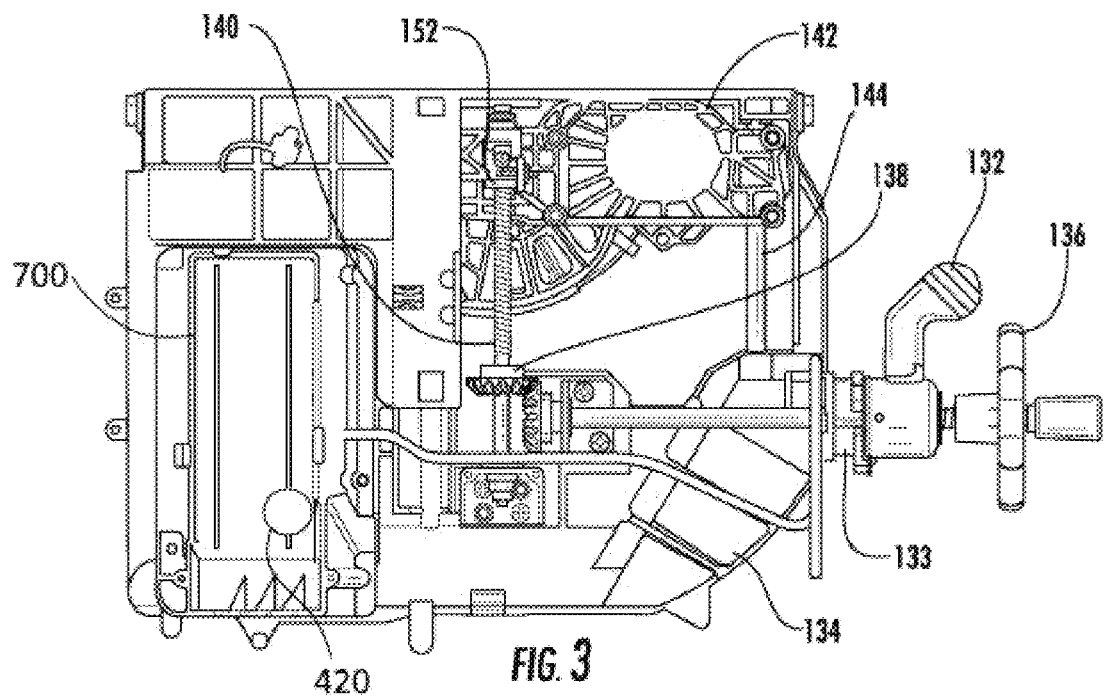
FIG. 3 depicts a side plan view of the left side of the table saw of FIG. 1 with the housing, workpiece support surface, and bevel plate removed.

As further depicted in FIG. 3, a height adjust wheel 136 is used to adjust the height of the blade 118 above the workpiece support surface 108 (not shown in FIG. 3). Rotation of the height adjust wheel 136 rotates a bevel gear 138 which is engaged with a threaded rod 140. The threaded rod 140 is thus forced to rotate either clockwise or counterclockwise, depending upon the direction in which the height adjust wheel 136 is rotated. The threaded rod 140 threadedly engages a height adjust carriage 142. In one embodiment, the threaded rod 140 engages a threaded bushing 152 of the height adjust carriage 142. The height adjust carriage 142 is thus forced to move upwardly and downwardly as the threaded rod 140 rotates.

Figure 4:
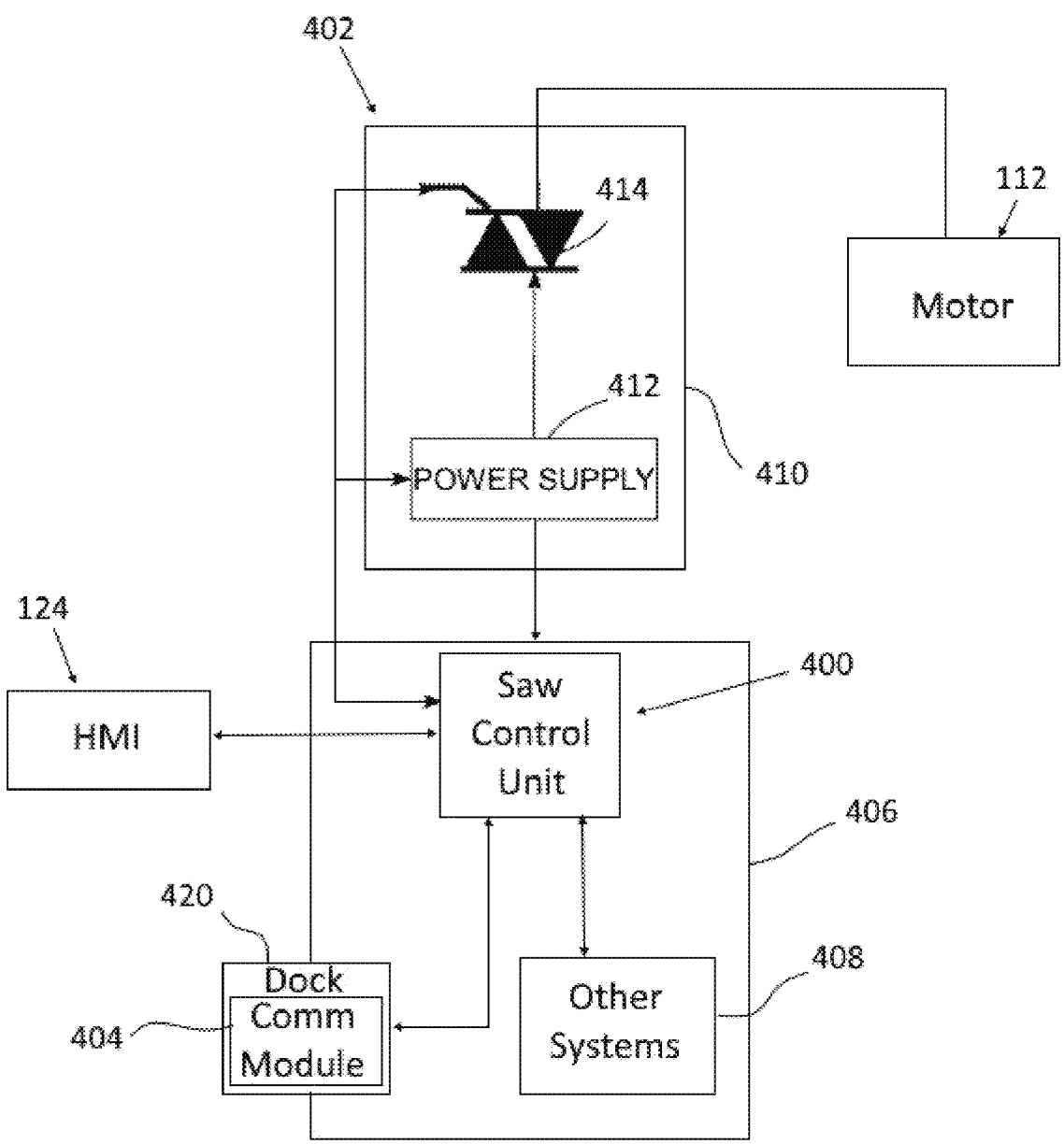
FIG. 4 is a schematic block diagram of the electrical system of the table saw of FIG. 1.

FIG. 4 is a schematic depiction of relevant portions of the electrical system of the table saw assembly 100. The electrical system includes a saw control unit (SCU) 400, a power distribution unit 402, the human machine interface (HMI) 124, and a wireless communication module 404. The saw control unit 400 includes components used to control the table saw assembly, such as a processor, memory and the like. The saw control unit 400 is implemented on a printed circuit board (PCB) 406. Other systems 408 of the table saw may also be implemented on the PCB such as an object detection system which enables the detecting or sensing of the proximity or contact of some appendage of an operator with some part of the equipment so that a safety measure may be taken.

A separate PCB 410 supports a power supply 412 and a control TRIAC 414. The power supply 412 receives an alternating current (AC) electrical power signal from an external power source, such as a generator or electrical utility provider, and supplies electrical power to the motor 112 through the TRIAC 414. In the embodiment of FIG. 4, the power supply 412 is a switched power supply that converts the AC power signal from an external power source to a direct current (DC) electrical power signal at one or more voltage levels to supply power to the controller 400 and other components of the system. The separate PCBs 406, 410 for the controls and power isolate the control unit 400 from the power supply 412 and TRIAC 414 to improve cooling of the digital electronics in the control unit 400 and to isolate the control unit 400 from electrical noise.

The HMI 124 includes at least one output device configured to provide some form of feedback to an operator of the table saw in the form of a visual indicator, audible signal, and the like. The HMI 124 may include input devices, such as switches, buttons, and the like, that enable operator interaction with the control unit. The HMI is a permanent fixture of the table saw.

The wireless communication module 404 enables the operator to interact with the control unit 400 using external devices. In particular, the wireless communication module 404 includes an antenna and a wireless transceiver that provides a wireless communication channel via which an external electronic device, such as a smartphone, tablet, portable notebook computer, or other mobile electronic device receives data from the saw control unit and optionally transmits information to the saw control unit.

Figure 5:
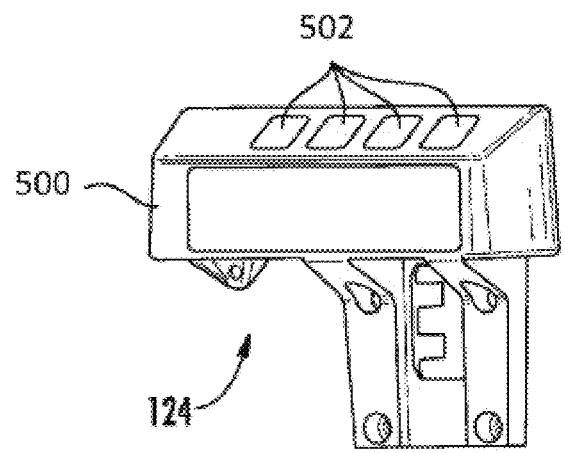
FIG. 5 depicts a side perspective view of the human machine interface (HMI) of FIG. 1.
Figure 6:
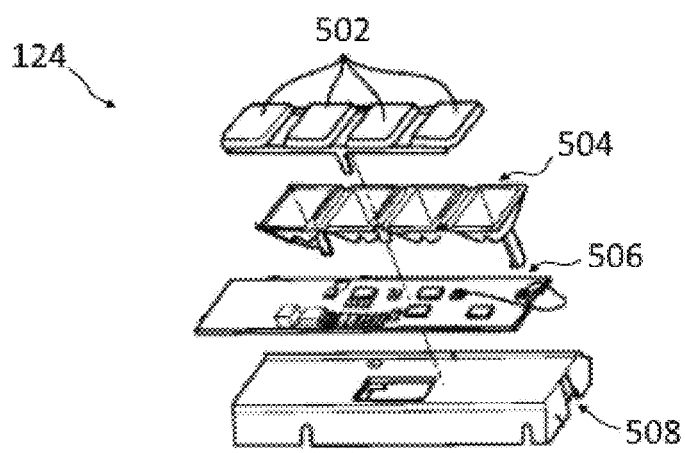
FIG. 6 depicts an exploded view of the internal components of the HMI of FIG. 5.

The HMI 124 is shown in greater detail in FIGS. 5 and 6. The HMI unit 124 includes a housing 500 and a plurality of feedback or status indicators 502. As shown in FIG. 5, the status indicators 502 are illuminated by four LEDs 504 on a printed circuit board (PCB) 506. In some embodiments, the LEDS 504 are each provided as a colored LED having a color different from the other of the LEDSs. The PCB 506 is supported by a support 508 which is attached to the housing 500.

The status indicators 502 are used to provide desired alerts or status indicators to a user. In some embodiments, the status indicators 502 indicate power available, safety system in bypass, safety or system error which is correctable by the user, and safety or system error which is correctable by a service center. In different embodiments, more or fewer status indicators 502 are provided. The construction of the HMI 124 enables viewing of the status indicators 502 even in bright sunlight.

The PCB 406 for the control unit 400 is provided on the table saw in a manner and location so as to protect the PCB 406 from external influences, such as vibrations, electrical interference, signal noise, and the like. In the embodiment of the table saw depicted in FIGS. 1-3, the PCB 406 is provided in a control unit housing 700 which is mounted onto the carriage 134, as best seen in FIG. 3.

Figure 7:
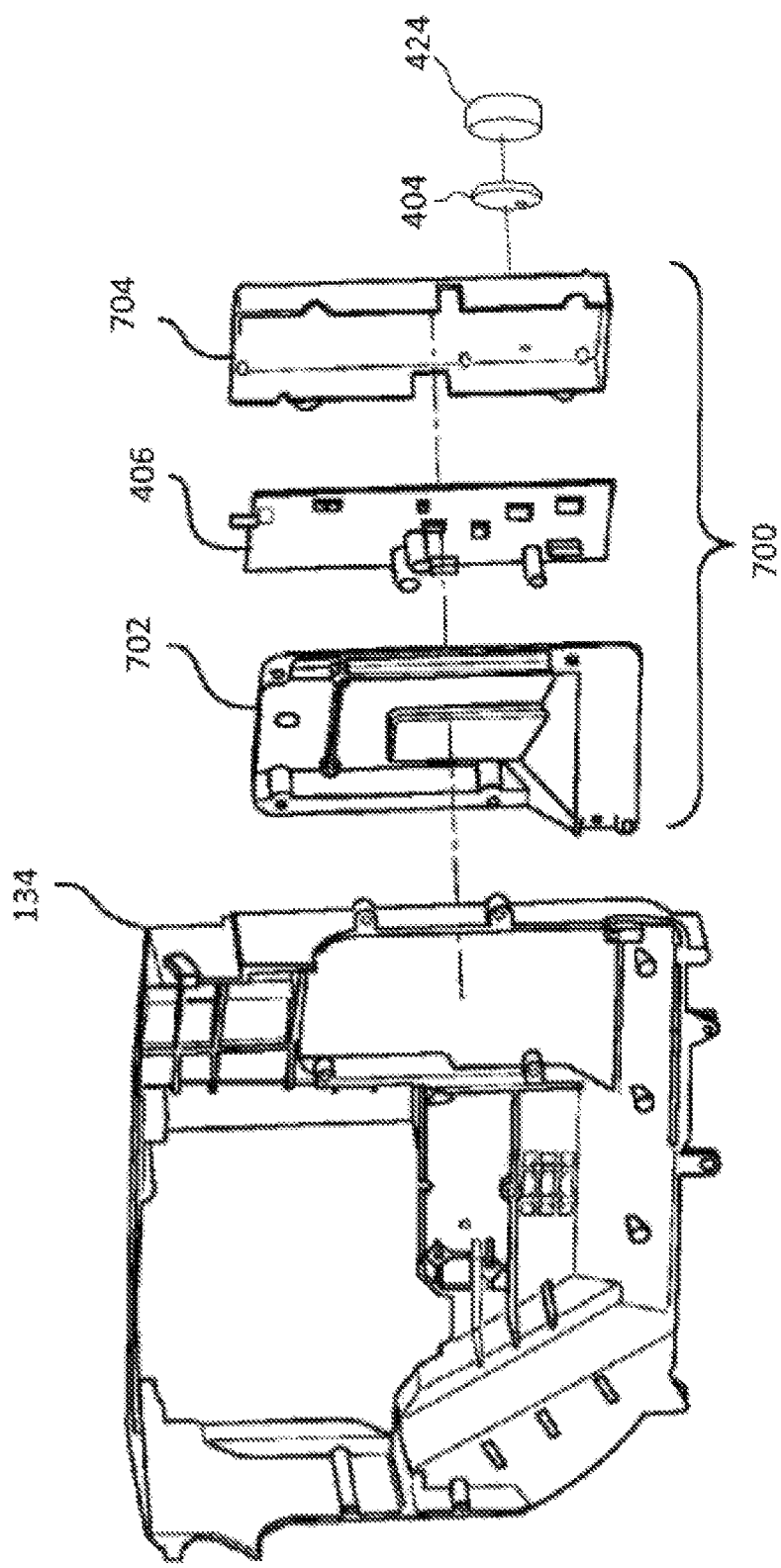
FIG. 7 is an exploded view of the components of the saw control unit of the table saw of FIG. 1.
Figure 8:
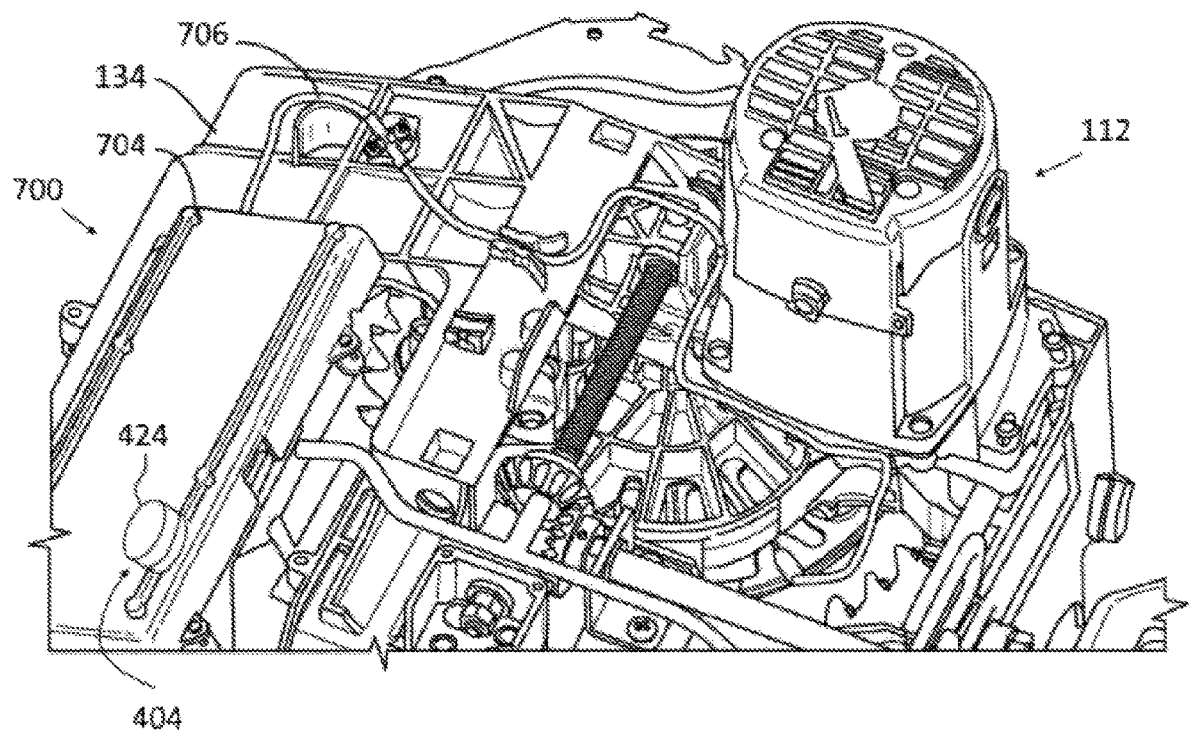
FIG. 8 depicts a side perspective view of the carriage of the table saw of FIG. 1.

The control unit housing 700 and PCB 406 are shown in greater detail in FIGS. 7 and 8. The control unit housing 700 includes a base housing member 702 and a cover member 704. The base housing member 702 is fastened to the carriage 134. The PCB 406 is fastened to the base housing member 702, and the cover 704 is secured over the PCB 406. This position is convenient for wire routing. As can be seen in FIG. 8, a cable 706 extends from the control unit housing 700 which is used to connect the PCB 406 to the power distribution system.

The wireless communication module 404 is a removable module that enables data to be transmitted and received wirelessly. To this end, the wireless communication module 404 includes an antenna and a wireless transceiver. The configuration of the antenna and the transceiver depends on the type of wireless communication implemented. The wireless communication protocol that is implemented can be near field communication (NFC), Bluetooth, IEEE 802.11 protocol family compatible ("Wi-Fi"), or other suitable short-range wireless protocols.

The wireless communication module 404 is configured to be easily installed and removed from the table saw as a singular device. Different communication modules may be configured to utilize different communication protocols or may have updated hardware while maintaining the same connection interface for the dock. Having a removable configuration enables different communication modules to be swapped into and out of the table saw in a quick and simple manner.

Figure 9:
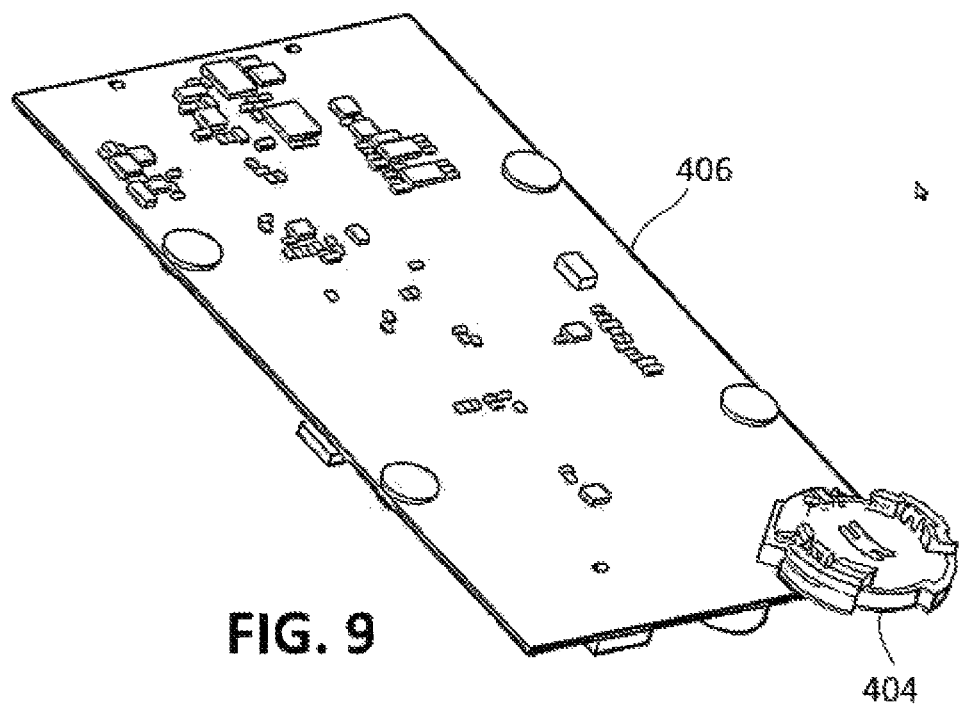
FIG. 9 is a perspective view of the control unit PCB and the wireless communication module of the table saw of FIG. 1.
Figure 10:
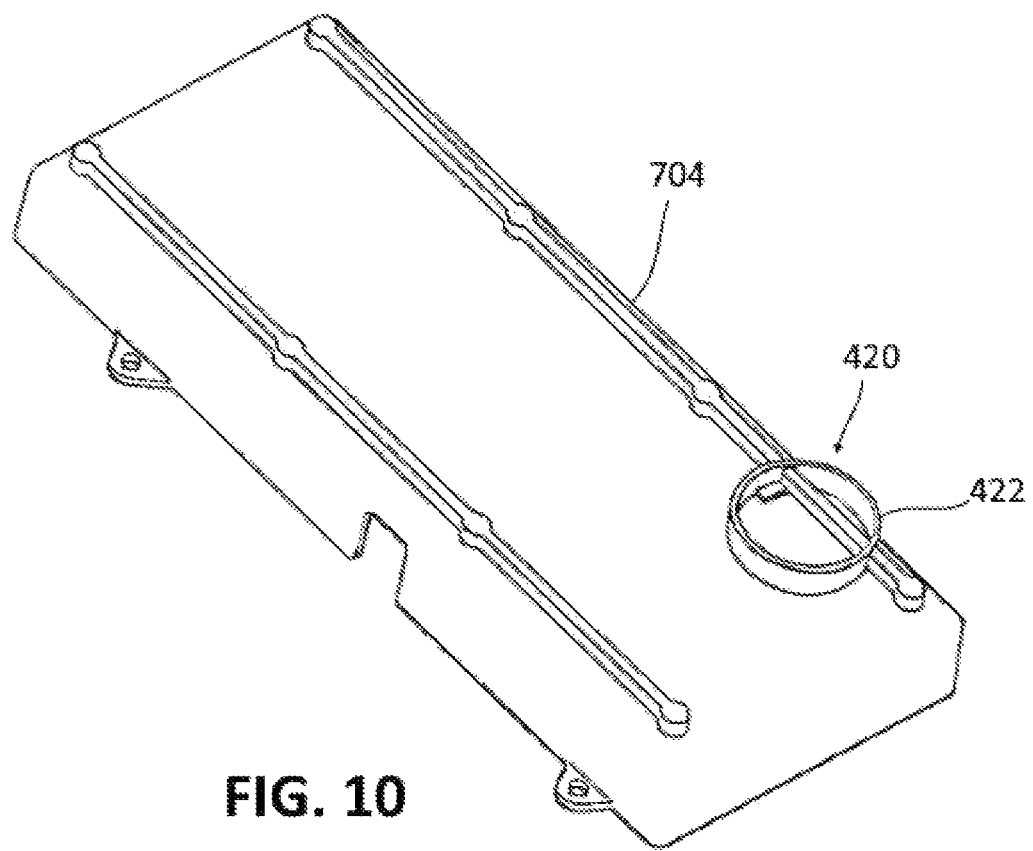
FIG. 10 is a perspective view of the cover of the housing of the control unit depicted in FIG. 7.

The table saw includes a dock 420 for the wireless communication module. The dock 420 is configured complementarily with respect to the wireless communication module 404. Therefore, the size, shape and design of the dock 420 depends on the size, shape and design of the communication module 404. As best seen in FIG. 9, the wireless communication module 404 comprises a small circular disc shaped object. The dock 420 comprises a circular wall 422 (FIG. 10) which surrounds a space sized to snugly accommodate the circular disc. A cap 424 is provided that attaches to the wall and encloses the space thereby providing security and protection for the wireless communication module.

The dock may be provided at any suitable location on the table saw that can be accessed when needed to remove/replace a wireless communication module. As depicted in FIGS. 3, 7 and 8, the wireless communication module 404 may be provided on an exterior surface of the control unit housing 700, and in particular, the cover 704, where it can be in close proximity to the PCB 406. In one embodiment, the dock wall 422 may be formed integrally with the control unit housing 704. In another embodiment, the dock 422 may comprise a separate structure which is attached to the control unit housing 704. In yet another embodiment, the dock may be in another part of the saw, such as the base 106, and connected to the PBCA 406 via a cable.

The dock 420 includes connection terminals that enable the wireless communication module 404 to be electrically and operably connected to the PCB 406 when the module is seated in the docking position. In one embodiment, the dock 420 and the module 404 are provided with complementary connection terminals which cooperate to establish the appropriate connection when the module is received in the dock. Any suitable type of connection may be used. In one embodiment, a sim card connector is used to establish a connection between the wireless communication module 404 and the PCB 406.

The wireless communication module 404 enables wireless communication between the saw control unit and external electronic devices, such as smartphones, tablets, portable notebook computers, and the like. For example, a smartphone receives diagnostic data from the saw and a software application that is run on the smartphone displays detailed diagnostic information to an operator or maintenance technician to assist in maintenance of the saw. The software application optionally enables the operator to input configuration information for operational parameters of the saw that are not directly accessible through the simplified HMI 124. For example, in one configuration the software application enables the operator to input a maximum RPM rate for the motor 112 and blade. In another configuration, the software application enables the operator to transmit an identifier for a type of material that the saw will cut during operation, such as different types of wood, ceramics, plastics, and the like.

In another configuration, the saw includes a lockout mechanism to prevent operation of the saw unless a mobile electronic device with an appropriate cryptographic key is within a predetermined distance of the saw. The mobile electronic device transmits an encrypted authorization code to the saw in response to a query from the saw to unlock the saw for operation. When the mobile electronic device is removed from proximity from the saw, a subsequent query fails and the saw remains inactive.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A table saw comprising:
a base housing including a workpiece support surface, the workpiece support surface defining a blade opening;
a cutting assembly supported by a cutting assembly carriage within the base housing and including a saw blade that extends upwardly through the blade opening;
a power supply configured to supply power to the cutting assembly;
a saw control unit operably coupled to the power supply for controlling the supply of power to the cutting assembly;
a wireless communication module dock including first electrical terminals, the first electrical terminals being operably connected to the saw control unit; and
a wireless communication module configured to be removably received in the wireless communication module dock, the wireless communication module having second electrical terminals configured to be operably connected to the first electrical terminals when the wireless communication module is received in the wireless communication module dock,
wherein the wireless communication module includes an antenna and a wireless transceiver, the antenna and the wireless transceiver being configured to implement a first wireless communication protocol.

2. The table saw of claim 1, further comprising:
a human machine interface mounted to the base housing and having a wired connection to the saw control unit, the human machine interface including at least one output device configured to provide output feedback to an operator of the table saw.

3. The table saw of claim 1, wherein the saw control unit includes a first printed circuit board, the first printed circuit board being enclosed within a control unit housing, the control unit housing being located on the cutting assembly carriage.

4. The table saw of claim 3, wherein the wireless communication module dock is located outside of the control unit housing.

5. The table saw of claim 4, wherein the wireless communication module dock is provided on an outer surface of the control unit housing, and includes a cap that encloses the docking position.

6. The table saw of claim 4, wherein the first electrical terminals are operably connected to the first printed circuit board.

7. The table saw of claim 6, wherein the wireless communication module dock holds the wireless communication module in a fixed position in relation to the control unit housing.

8. The table saw of claim 4, wherein the wireless communication module is implemented on a second printed circuit board.

9. The table saw of claim 1, wherein the first wireless communication protocol is one of a Bluetooth protocol, a near field communication (NFC) protocol and an IEEE 802.11 protocol.

10. The table saw of claim 1, further comprising:
a further wireless communication module configured to be removably received in the wireless communication module dock, the further wireless communication module having third electrical terminals configured to be operably connected to the first electrical terminals when the wireless communication module is received in the wireless communication module dock,
wherein the further wireless communication module includes an antenna and a wireless transceiver configured to implement a second wireless communication protocol, the second wireless communication protocol being different than the first wireless communication protocol.

11. A table saw comprising:
a power supply;
a saw control unit operably coupled to the power supply;
a human machine interface including at least one output device configured to provide output feedback from the saw control unit to an operator of the table saw;
a wireless communication module dock; and
a wireless communication module configured to be removably received in the wireless communication module dock, the wireless communication module being operably connected to the saw control unit when received in the wireless communication module dock,
wherein the wireless communication module includes an antenna and a wireless transceiver, the antenna and the wireless transceiver being configured to implement a first wireless communication protocol,
wherein the saw control unit includes a first printed circuit board, the first printed circuit board being enclosed within a control unit housing, and
wherein the wireless communication module dock is provided on an outer surface of the control unit housing, the wireless communication module dock including a removable cap that encloses the wireless communication module in the docking position.

12. The table saw of claim 11, wherein the wireless communication module dock holds the wireless communication module in a fixed position in relation to the control unit housing.

* * * * *